United States Patent [19]
Berney

[11] 3,806,781
[45] Apr. 23, 1974

[54] ELECTRIC OSCILLATION MAINTENANCE CIRCUIT FOR MOTOR ELEMENT OSCILLATIONS

[75] Inventor: Jean-Claude Berney, Lausanne, Switzerland

[73] Assignee: Bernard S.A., Lausanne, Switzerland

[22] Filed: June 28, 1972

[21] Appl. No.: 268,188

[30] Foreign Application Priority Data
June 29, 1971 Switzerland.................... 9492/71

[52] U.S. Cl............ 318/130, 331/116 M, 58/23 A, 318/132
[51] Int. Cl. .................................... H02k 33/10
[58] Field of Search ........................... 310/36; 318/119–134; 331/116 M, 145, 117, 171; 58/83, 23 V, 23 A, 28, 26, 23 AC

[56] References Cited
UNITED STATES PATENTS
| | | |
|---|---|---|
| 3,238,431 | 3/1966 | Raval.................... 318/130 |
| 3,451,210 | 6/1969 | Hetterline, Jr. et al.............. 58/26 |
| 3,618,311 | 11/1971 | Wiesner et al..................... 331/145 |
| 3,629,727 | 12/1971 | Berney.......................... 331/116 M |
| 3,648,453 | 3/1972 | Aizawa et al..................... 58/23 V |

*Primary Examiner*—D. F. Duggan
*Attorney, Agent, or Firm*—Eric H. Waters

[57] ABSTRACT

An electronic circuit is provided for maintaining the oscillations of an oscillating motor element which includes a pick-up and inductive coil generating an alternating current signal. This circuit comprises a power-level detector coupled to the aforesaid coil and a source of direct-current voltage coupled to the detector and establishing a threshold value therefor. An AND gate is provided including a first input coupled to the aforesaid detector and a second input. A source of an alternating-current signal is coupled to this second input. The frequency of the second said signal is greater than the frequency of the first said alternating-current signal.

8 Claims, 5 Drawing Figures

1

ELECTRIC OSCILLATION MAINTENANCE CIRCUIT FOR MOTOR ELEMENT OSCILLATIONS

FIELD OF INVENTION

This invention relates to electronic oscillation maintenance circuits for motor element oscillations.

BACKGROUND

In watchmaking and other industries, oscillating type motor elements are frequently employed, which are maintained in oscillation by electrical pulses and which comprise in general at least one magnet and one coil which move relative one another, said pulses being supplied by an electronic circuit.

One such electronic circuit which has been used comprises an induction coil associated with a pick-up coil, the latter being subjected to the pulsation of induced currents produced on each passage of a magnet, this facilitating the closure of a driving circuit. Such an arrangement has the drawback of needing two coils which being generally located on a common core either take up extra space or, if occupying the same amount of space, give less efficiency for that volume.

Single-coil oscillation maintenance circuits have also been designed in the past, in which the duration of the driving pulse is electroncially determined, the stability of such duration being difficult to achieve due to the fact that the entire unit must consume very little power.

SUMMARY OF INVENTION

An object of this invention is to provide an improved circuit which avoids the above and various other drawbacks.

The above and other objects of the invention are achieved by the use of a power-level detector at the input end f the circuit whereat the voltage of a single coil which is used simultaneously for pick-up and induction for the motor unit is applied, which the output voltage of the said dector acts on an AND gate, whose second input is connected to the output of a rectangular-wave alternating-current voltage generator of a frequency possibly higher than the motor element oscillation frequency, such that the pulses governed by the rectangular-wave alternating-current voltage may be applied to the coil in the same direction as the magnetically induced voltage therein as long as the said induced voltage exceeds the threshold voltage of the power level detector.

More particulaly, there is provided in accordance with the invention an electronic circuit for maintaining the oscillations of an oscillating motor element including a pick-up and inductive coil generating an alternating-current signal. This circuit comprises a power level detector coupled to said coil, a source of direct-current voltage coupled to said detector and establishing a threshold value therefor and an AND gate including a first input coupled to said detector and a second input to which is connected a source of an alternating-current signal. The frequency of the second said alternating-current signal is greater than the frequency of the first said alternating-current signal and the second said signal is applied to the aforesaid coil in the same direction as the first said signal while the latter exceeds the threshold value mentioned above.

The frequency of the second said signal is related to that of the first said signal according to a preferred embodiment, such that the period of the first said signal is five to 10 times that of the second said signal. The second said signal may preferably be a rectangular-wave signal.

According to one feature of the invention, the aforesaid detector may include a resistor and diode in series between said source of direct-current voltage and coil and a transistor including a base connected between said diode and resistor and a collector connected to an input of said AND gate.

According to another aspect of the invention, the aforesaid detector may include a high-capacity condenser and resistor connected between said coil and source of direct-current voltage. A transistor including a base and a collector connected to an input of said AND gate and a resistor connecting said base between said coil and the first said resistor.

Other features of the invention will be pointed out in the detailed description which follows hereinafter as illustrated in the attached drawing.

BRIEF DESCRIPTION OF DRAWING

The attached drawing illustrates two embodiments of the invention and a type of motor to which they can be applied, all mearly for purposes of illustration without limitation.

In the drawing.

DETAILED DESCRIPTION

Figure 1:
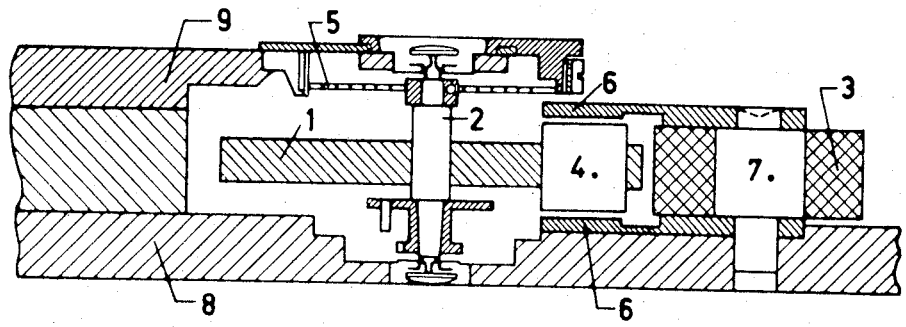
FIGS. 1 and 2 are respectively a plan view and a vertical cross section of a motor with which the circuit of the invention can be used.
Figure 2:
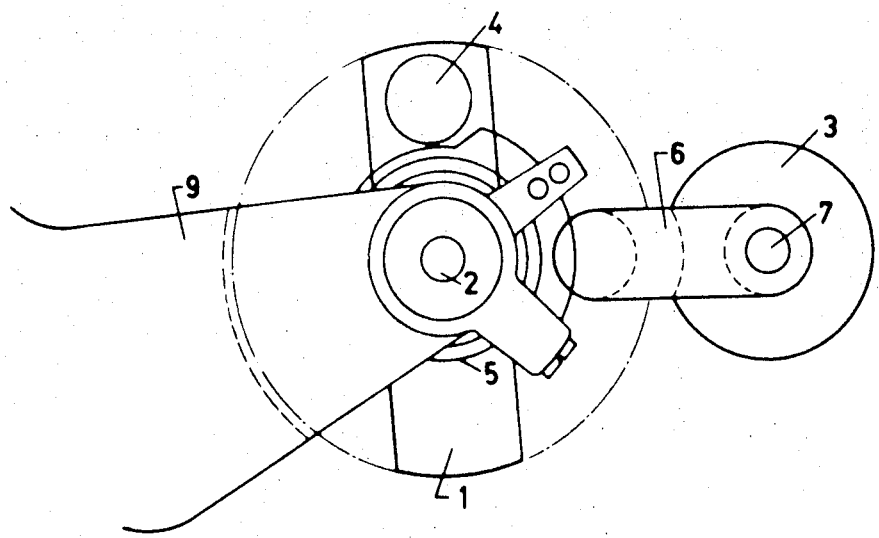

As shown in FIGS. 1 and 2, the motor includes a mechanical resonator 1, in balance-beam form, constituting a stirrup rotating on a spindle 2, under the action of electrical pulses transmitted to the winding of an induction coil 3 acting on a magnet 4 carried by the beam. This latter is further connected to a helical spring 5 as is customary for the balance stirrups in clockwork movements.

The magnet 4 is so arranged as to be able, when the resonator is in resting position, to locate between the armatures 6 of the electromagnet formed by the induction coil 3 and its core 7.

The mechanism is generally arranged between a plate 8 and a bridge 9.

It will be understood that on each passage of magnet 4 between the armatures 6, a voltage is induced in coil 3. The flux increases, passes through a maximum, then decreases as the magnet recedes from the magnetic circuit.

Figure 3:
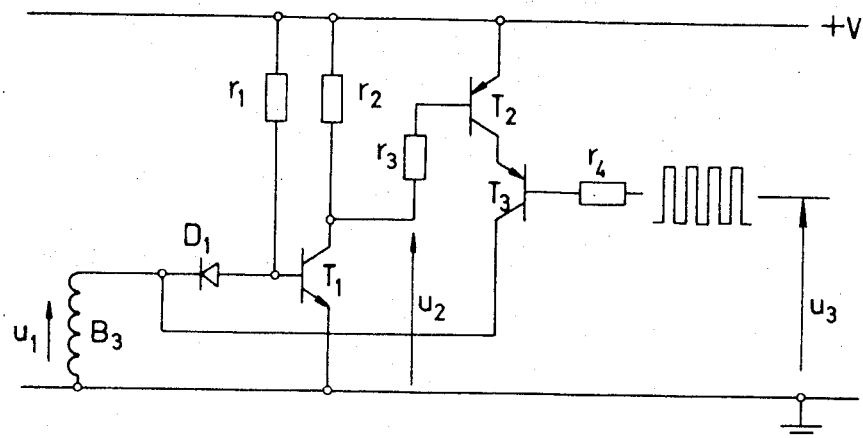
FIG. 3 is a schematic diagram of a circuit according to a first embodiment of the invention.

The circuit layout of FIG. 3, relating to the first embodiment of the invention, is applied to the motor element just described. Coil 3 is situated at $B_3$. This circuit is loaded under a continuous voltage designated +V. A generator of rectangular waves of a frequency higher (e.g. preferably the period of the rectangular wave is five to ten times smaller than that induced in coil 3) than the oscillation frequency of the motor element is further provided, acting through the resistance $R_4$ on the base of a transistor $T_3$ of an AND gate formed of the said transistor, the transistor $T_2$ and the resistance $R_3$. The voltage of said rectangular waves is equal to $U_3$ (this value and that of other voltages being obtained from the chart of FIG. 5).

A power level detector, connected to coil $B_3$ is, in its turn, constituted by diode $D_1$ and the resistance $R_1$, between which the base of a transistor $T_1$ is connected, the collector whereof is connected to resistance $R_2$. The detector has a threshold values related to applied voltage $+V$.

Allowing the diode voltage of transistor $T_1$ to be slightly higher than the diode voltage of $D_1$, the following is the result:

When the voltage induced in coil $B_3$ is zero, the current proceeding from the source $+V$ and travelling through the resistance $R_1$ is short-circuited by diode $D_1$ and the interpolated transistor $T_1$ is cut out. The voltage $U_2$ applied by $R_3$ is also equal to $+V$, the transistor $T_2$ being consequently cut out and not allowing current to pass into transistor $T_3$. The circuit acts similarly when the voltage induced in coil $B_3$ is negative.

If, on the contrary, the voltage $U_1$ becomes positive, the current travelling through the resistance $R_1$ will pass into the base of the transistor $T_1$ rather than through diode $D_1$ and will make transistor $T_1$ conductive.

The voltage $U_2$ becomes equal to zero and a current passing through the transistor $T_1$ and resistance $R_3$ arrives at the base of the transistor $T_2$ which it makes conductive. When the output voltage of the rectangular-wave generator simultaneously passes through zero, it sets up a current which reaches through resistance $R_4$ to the base of the transistor $T_3$ which it makes conductive in turn. The transistors $T_2$ and $T_3$ being at that instant both conductive, the supply voltage $+V$ is released and appears at the terminal of coil $B_3$, disappearing then immediately as the output voltage of the generator again becomes equal to $U_3$.

As long as the voltage induced in coil $B_3$ remains positive, it will receive such a pulse at each passage of the generator voltage through zero, namely during each half-period of an alternating-current rectangular-wave.

Figure 5:
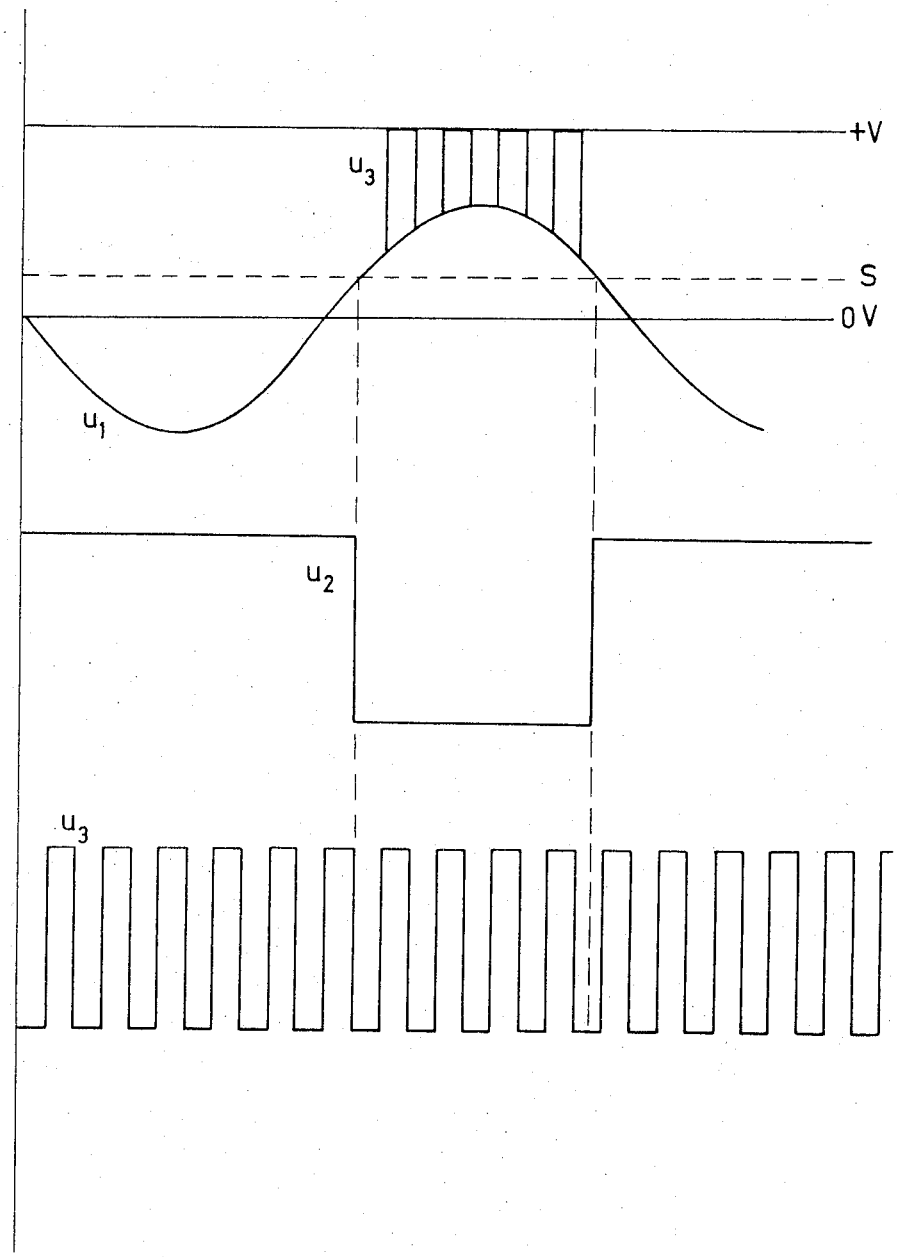
FIG. 5 illustrates the voltage wave forms at various points of the circuits.

FIG. 5 illustrates the voltage curves corresponding to what has been described above.

The top portion shows the curve of the voltage $U_1$ induced in coil $B_3$, the line S corresponding to what is called the threshold voltage, namely the voltage measured by the power level detector.

The central portion shows the variation of voltage $U_2$ passing from $+V$ to zero at the instant and while the threshold is being crossed.

Finally, the bottom portion shows the rectangular alternating-current voltage $U_3$ of the generator of which the top curve shows how such voltage brings about the emission of inducing pulses of voltage $+V$ to coil $B_3$ from the instant the positive induced voltage oversteps the threshold S.

Obviously the voltage $U_3$ could be equal to $+V$ but that is not required. As to its frequency, it will be so chosen, for example, that its period will be five to 10 times smaller than the time during which the voltage induced in coil $B_3$ is positive.

In the example described, the voltage $+V$ acts directly on coil $B_3$, but an amplifier could also be arranged at the output of the transistor $T_3$.

Figure 4:
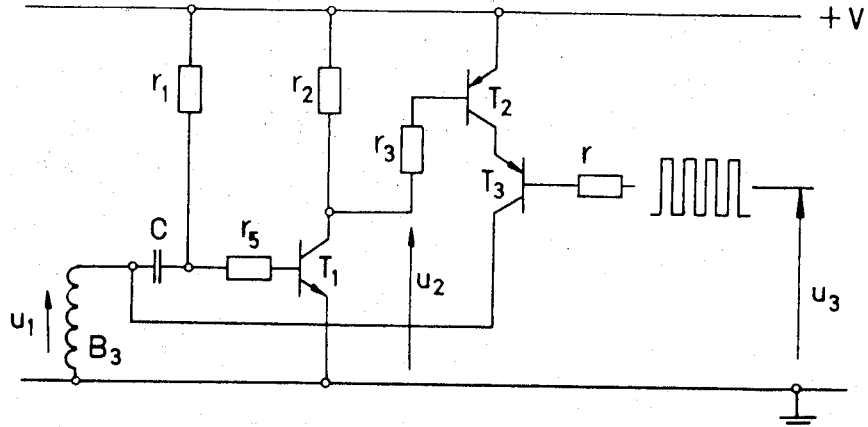
FIG. 4 is a schematic diagram of a circuit according to a second embodiment of the invention.

The layout of the second embodiment shown in FIG. 4 differs from the foregoing only in the constitution of the power level detector, wherein a condenser $C_1$ takes the place of diode $D_1$. This condenser must have a relatively large valued capacity, otherwise it would operate as a filter and the power level detector would not fulfill its role.

Finally, it is clear that the amount of power supplied to coil $B_3$ can be adjusted at discretion, by modifying the contour of the rectangular alternating waves. In FIG. 5, these waves are symmetrical, that is to say that each half-period is of the same duration. Increasing the length of the zero voltage portion relative to that of voltage $U_3$, the coil $B_3$ will be supplied with an amount of power which is greater as such disproportion is increased in favor of the $U_3$ voltage portions.

To summarize the advantages effected by a circuit constructed in accordance with the present invention, it is noted that the design and simplified assembly of the single-coil motor element gives increased efficiency arising from lower power consumption and gives the possibility of measuring the power electronically.

The power level detector can of course be of any type besides the two examples described, as by using, for instance, wholly or partially bipolar transistors or MOs. It can be integrated wholly or partially, in particular by employing an integrated COS-MO circuit allowing extremely low consumptions to be obtained.

The circuit according to this invention also favors the oscillation maintenance of a motor element having a single magnet as well as of a motor element having several magnets.

What is claimed is:

1. An electronic circuit for maintaining the oscillations of an oscillating motor element including a pickup and inductive coil generating an alternating current signal; said circuit comprising a power-level detector coupled to said coil, a source of direct-current voltage coupled to said detector and establishing a threshold value therefor, an AND gate including a first input coupled to said detector and a second input; and a source of an alternating current signal coupled to the second input of said AND gate, the frequency of the second said alternating-current signal being greater than the frequency of the first said alternating-current signal, the second said signal being applied to said coil in the same direction as the first said signal while the latter exceeds said threshold value, the frequency of the second said signal being related to that of the first said signal so that the period of the first said signal is a plurality of times that of the second said signal.

2. A circuit as claimed in claim 1 wherein the frequency of the second said signal is related to that of the first said signal so that the period of the first said signal is five to 10 times that of the second said signal.

3. A circuit as claimed in claim 1 wherein the second said signal is a rectangular-wave signal.

4. A circuit as claimed in claim 3 wherein the rectangular-wave signal is asymmetrical and includes a null portion greater than the balance of each period.

5. A circuit as claimed in claim 1 wherein said detector includes a resistor and diode in series between said source of direct-current voltage and coil, and a transistor including a base connected between said diode and resistor, and a collector connected to an input of said AND gate.

6. A circuit as claimed in claim 1 wherein said detector includes a high-capacity condenser and resistor connected between said coil and source of direct-current voltage, a transistor including a base and a collector connected to an input of said AND gate, and a resistor connecting said base between said coil and the first said resistor.

7. A circuit as claimed in claim 1 wherein said AND gate includes a transistor coupled between said source of an alternating-current signal and said coil and a transistor coupled between the first said transistor and said detector.

8. A circuit as claimed in claim 7 comprising a resistor between the second said transistor and dectector.

* * * * *

UNITED STATES PATENT AND TRADEMARK OFFICE
CERTIFICATE OF CORRECTION

PATENT NO. : 3,806,781
DATED : April 23, 1974
INVENTOR(S) : BERNEY

It is certified that error appears in the above-identified patent and that said Letters Patent are hereby corrected as shown below:

In Column 1, Line 5 of the patent, cancel "BERNARD S.A." and substitute therefor "BERNARD GOLAY S.A.".

Signed and Sealed this

Tenth Day of May 1977

[SEAL]

Attest:

RUTH C. MASON
*Attesting Officer*

C. MARSHALL DANN
*Commissioner of Patents and Trademarks*